June 21, 1927.
I. BESKIN
1,633,391
AUTOMATIC TOASTING AND BUTTERING MACHINE
Filed Feb. 23, 1926
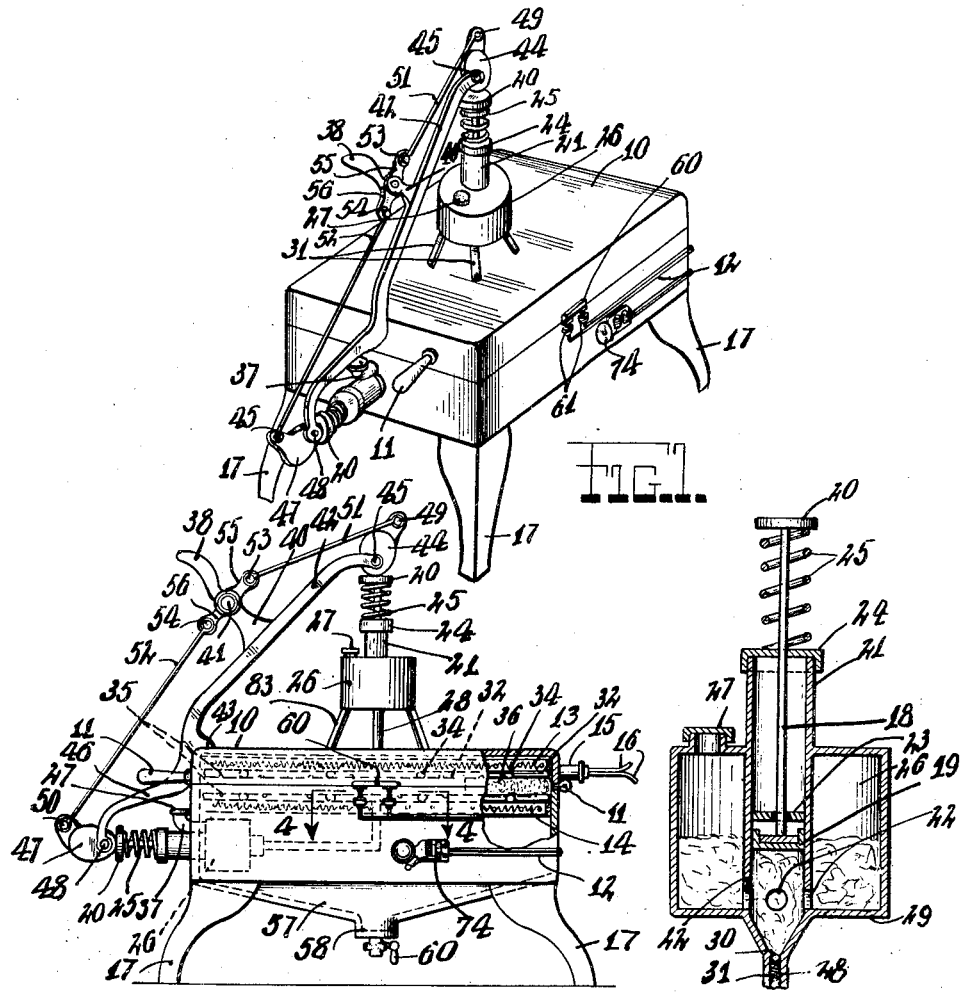
INVENTOR.
Irving Beskin
BY
ATTORNEY Patented June 21, 1927.

1,633,391

UNITED STATES PATENT OFFICE.

IRVING BESKIN, OF JERSEY CITY, NEW JERSEY.

AUTOMATIC TOASTING AND BUTTERING MACHINE.

Application filed February 23, 1926. Serial No. 89,839.

This invention relates to a new and useful improvement for electric toasters and the like, particularly adapted for automatically buttering the bread or food stuff to be toasted.

The object of the invention is to provide a butter spraying device of novel construction and arrangement of parts, hereinafter more fully described, claimed, and illustrated in the accompanying drawing in which, Fig. 1 shows a perspective view of an electric toaster with device attached.

Fig. 2 shows a side elevational view of an electric toaster with device attached.

Fig. 3 shows an enlarged sectional view of the pump element as used in connection with my improved device.

Fig. 4 shows an enlarged fragmentary sectional view taken on the line 4—4 of Fig. 2.

Fig. 5 shows a diagrammatic view of the wiring and connected elements.

The electric toaster comprises an upper member 10, hinged, as at 11 to a base member 12, with upper heating element 13, and lower heating elements 14, which are suitably connected to a socket 15, to accommodate the electric wires 16, which are connected to any suitable convenient source of electric power not shown in the accompanying drawing. The base element 12 has depending supports 17, or legs, suitably attached thereto. The above mentioned parts are those in common to electric toasters of ordinary construction such as generally used for toasting bread or food stuffs of all varieties. It being understood, that I do not necessarily limit my invention to the particular type of electric toasters hereinbefore set forth and described.

As here embodied my improved device comprises a pump element consisting of a plunger 18 having a suitable packing washer 19 attached at its lower or inner extremity, and a knob 20 or handle attached at its upper or outer extremity. The plunger 18 is a slidable fit in the cylinder 21, which has a plurality of apertures 22 located directly below the upper position of the plunger 18, the said upper position of the plunger being located by a ring 23 attached to the cylinder 21 so as to be removable, by threads or any similar suitable means. The cylinder 21 is also provided with a cap 24 removably attached thereto, at the upper or outer extremity of the cylinder 21 and having an axial aperture to accommodate the said plunger 18, which extends through the said cap 24. The coil spring 25 superimposed between the knob 20 and the upper side of the cap 24, holds the plunger 18 in a normally extended position, as clearly shown in Fig. 3 of the accompanying drawing. The cylinder 21, is mounted in a container 26, preferably cylindrically shaped, and having a removable filler cap 27, attached to its upper end by threads, or any similar suitable means. The container 26 is also provided with an outlet 28 at its lower end or bottom 29, the outlet 28 being intercommunicative with the cylinder 21 and having a ball check valve 30, of ordinary construction, normally held in a closed position by a coil spring 31. The cylinder 26 is suitably attached to the upper member 10, by the supports 33. The longitudinal pipe 32 or tube, is connected to the outlet 28, below the ball check valve 30, and extends the entire length of the heretobefore mentioned upper heating element 13, the ends or extremities of the said longitudinal pipe 32 are closed, by plugs, or any similar suitable means. A plurality of transverse pipes 34 are connected thereto, and are intercommunicative with the longitudinal pipe 32, and extend the entire width of the upper heating element 13, said longitudinal pipes 32 and said transverse pipes 34 having a plurality of apertures 35 located directly above the bread 36 to be toasted.

The above mentioned described construction is such as will permit butter, or the like, in liquid form, in the container 26, below the packing washer 19, when the knob 20 is formed or pressed downward to be projected or sprayed on the upper side of the bread, which is in sliced form, as designated by the reference numeral 36 in the accompanying drawing.

It will be understood that a second pump element is provided with a similar mechanism, as above described, to accomplish a similar function on the lower side of the bread, in sliced form, as designated by the reference numeral 36, in the accompanying drawing. It being further understood that the filler cap 27, may be attached to an elbow 37, as the container 26 of the second pump element is vertically disposed.

As a means of depressing the knobs 20 of the said pump element and the said second pump element, I have provided a handle 38, pivotally attached to a support 40, as at 41, the support being attached to or integral with a bracket 42 rigidly attached to the upper member 10, as at 43, and extending therefrom so as to pivotally support a cam 44 or eccentric as at 45, located directly over the knob 19, a second bracket 46, is rigidly attached at one extremity to the upper member 10, extending therefrom so as to pivotally support a second cam 47 or eccentric, as at 48, located directly over the knob 19 of the second pump element. The cam 44 and the second cam 47, have pivotally attached thereto, as at 49 and 50, respectively, two rods 51 and 52, respectively, which are also pivotally attached, as at 53 and 54, respectively, to protruding portions 55 and 56, respectively, at suitable angles to the handle 38.

The heretobefore described construction being such as will permit the handle 38 when pressed or forced downward to spray the butter on both sides of the bread.

As a means of collecting the butter, sprayed on the bread, as hereinbefore set forth and described, which does not adhere to the bread, I have provided a pan 57, of any suitable shape, and of suitable dimensions to enclose the bottom of the electric toaster, as clearly shown in Fig. 2 of the accompanying drawing. The pan 57, is provided with an extended portion 58 having suitably attached thereto a faucet 60, or similar valve, which may be opened when it is desired to drain the butter collected in the pan 57.

It will be also understood that my improved device may also be provided with contact points 60, attached to the said upper member 10, and connected together, so as to make contact with the contact points 61 suitably attached to the base member 12, when the said members 10 and 12 are hinged closed so as to complete a circuit by means of the wires 62 and 63, which are connected to a solenoid 64 and to wires 65 and 66, which are connected to any suitable convenient source of electric power, not shown in the accompanying drawing, the above mentioned wiring being such as will permit an electric current to energize the solenoid 64 having a movable core 67 and a depending rod 68, which is attached to the piston 69 of the dash pot 70, so as to cause the extended arms 71 attached to the rod 68 to close the contacts 72 and 73, to which the bell 74 or gong, is connected by means of the wires 75 and 76, which are also connected to the said wires 65 and 66, so as to ring the said bell 74. It being further understood that the extended arm 71 is normally held in a disengaged position, by means of a spring 77, and that the said contact point 72 is suitably attached to one extremity of the arm 78, which is pivoted as at 79, and which has suitably attached at its other extremity a contact point 80, which will disengage the contact point 81, when the extended arm 71 closed the said contacts 72 and 73, so as to break the supply of electric current through the said wires 16, to the heating elements 13 and 14.

It being further understood that the dash pot 70 is provided with a plurality of apertures 82, suitably located therein, and of suitable size, so as to permit the time element of the functioning of the said extended arm 71 to be such as will be required to toast the bread.

While I have above described the preferred form, construction, and arrangement of the several elements employed, it will be understood that the device is, nevertheless, susceptible of considerable modification therein, and I therefore reserve the privilege of resorting to all such changes as may be fairly embodied within the spirit and scope of the invention as claimed.

Having thus described my invention, what I claim as new and desire to protect by Letters Patent of the United States is as follows:

1. In a device of the class described a means of spraying butter in liquid form on the bread to be toasted comprising a pump element consisting of a plunger having a packing washer attached at its lower extremity, and a knob attached at its upper extremity, said plunger a slidable fit in a cylinder having a plurality of apertures located directly below the upper position of the said plunger, a coil spring, superimposed, to hold the said plunger, in a normally extended position, the said cylinder mounted in a container provided with an outlet at its lower extremity, said outlet intercommunicative with a cylinder and having a ball check valve normally held in a closed position by a spring, a pipe connected to the said pipe having its extremities closed, a plurality of second pipes connected to and intercommunicative with the said pipe, said pipe and said second pipes having a plurality of apertures.

2. In a device of the class described, an electric toaster comprising an upper and lower casing, a cylindrical reservoir for liquid butter mounted on said upper casing, a pump for discharging liquid butter from said reservoir comprising a cylinder mounted concentrically within said reservoir and having openings in the sides thereof communicating with the interior of said reservoir, a piston slidably mounted in said cylinder, a discharge pipe attached to the end of said cylinder for conveying liquid butter therefrom, and a plurality of intercommunicative pipes disposed longitudinally and laterally of said casing having apertures therein for discharging liquid butter on the upper side of toast.

3. In a device of the class described, an electric toaster comprising an upper and lower casing, a net work of intercommunicating pipes having a plurality of apertures therein mounted in said lower casing, a reservoir for liquid butter mounted in said lower casing below said net work of pipes, a pump for discharging liquid butter from said reservoir comprising a cylinder mounted in said reservoir having openings in the sides thereof communicating with the interior of said reservoir, a discharge pipe connected with said cylinder and with said plurality of intercommunicative pipes for conveying liquid butter thereto, and a plunger slidably mounted in said cylinder for forcing liquid butter through said discharge pipe and through said apertures in said network of pipes for discharging said liquid butter on the lower side of a piece of toast.

4. In a device of the class described, an electric toaster comprising an upper and lower casing, a cylindrical reservoir for liquid butter mounted on said upper casing, a pump for discharging liquid butter from said reservoir comprising a cylinder mounted concentrically within said reservoir and having openings in the sides thereof communicating with the interior of said reservoir, a piston slidably mounted in said cylinder, a discharge pipe attached to the end of said cylinder for conveying liquid butter therefrom, a plurality of intercommunicative pipes disposed longitudinally and laterally of said casing having apertures therein for discharging liquid butter on the upper side of toast, a net work of intercommunicating pipes having a plurality of apertures therein mounted in said lower casing, a reservoir for liquid butter mounted in said lower casing, a pump for discharging butter from said reservoir comprising a cylinder mounted in said reservoir having opening in the side communicating with the interior of said reservoir, a discharge pipe connected with said cylinder and with said net work of pipes for conveying liquid butter thereto, a piston slidably mounted in said lower cylinder for forcing liquid butter through said lower discharge pipe and through the openings in said net work of pipes for discharging said liquid butter on the lower side of a piece of toast, and operating mechanism operatively connected with the piston of said lower cylinder and with the piston of said upper cylinders adapted to simultaneously actuate the said pistons.

In testimony whereof I have affixed my signature.

IRVING BESKIN.